Sept. 13, 1966 S. D. BLOEMENDAAL 3,272,107

RADIAL VANE SHUTTER

Filed April 23, 1965

8 Sheets-Sheet 1

INVENTOR

Stanley D. Bloemendaal

BY Lane, Aitken, Dunner & Ziems

ATTORNEYS

INVENTOR
Stanley D. Bloemendaal
BY Lane, Aitken, Dunner & Ziems
ATTORNEYS

Sept. 13, 1966 S. D. BLOEMENDAAL 3,272,107

RADIAL VANE SHUTTER

Filed April 23, 1965

8 Sheets-Sheet 3

INVENTOR

Stanley D. Bloemendaal

BY Lane, Aitken, Dunner & Ziems

ATTORNEYS

Sept. 13, 1966

S. D. BLOEMENDAAL 3,272,107

RADIAL VANE SHUTTER

Filed April 23, 1965

8 Sheets-Sheet 4

INVENTOR

Stanley D. Bloemendaal

BY

Lane, Aitken, Dunner & Ziems

ATTORNEYS

INVENTOR
Stanley D. Bloemendaal
BY
Lane, Aitken, Dunner & Ziems
ATTORNEYS

INVENTOR
Stanley D. Bloemendaal

BY Lane, Aitken, Dunner & Ziems
ATTORNEYS

INVENTOR
Stanley D. Bloemendaal
BY
Lane, Aitken, Dunner & Ziems
ATTORNEYS

INVENTOR

Stanley D. Bloemendaal

BY Lane, Aitken, Dunner & Ziems

ATTORNEYS

United States Patent Office 3,272,107
Patented Sept. 13, 1966

3,272,107

RADIAL VANE SHUTTER

Stanley D. Bloemendaal, Melbourne, Fla., assignor to Geo Space Corporation, a division of Western Equities, Inc., Houston, Tex., a corporation of Nevada Filed Apr. 23, 1965, Ser. No. 450,389
30 Claims. (Cl. 95—59)

The present invention relates to shutters for use with high speed cameras and more particularly to a radial vane shutter for use with a ballistic camera.

It is one object of the invention to provide a shutter capable of operating at high speeds over large apertures to provide a high speed exposure capability for a long focal length ballistic camera.

It is another object of the invention to provide a radial vane shutter having pie-shaped blades individually driven from the outside perimeter thereof by a linkage system which minimizes vibration problems, and wherein the overall design provides high strength to inertia ratio and minimum blade deflections.

It is a further object of the invention to provide a clutch which can be consistently latched and unlatched at high speeds to engage and disengage the clutch with a continuously rotating source for opening and closing the shutter blades of a high speed shutter.

It is a still further object of the invention to provide a high speed shutter having shutter blades that can be latched in open and closed positions, or moved through a full cycle from closed to open and back to closed without being latched at the open position, either under manual control, or automatically cycled at high speeds.

It is a still further object of the invention to provide a high speed shutter of the type described above having an energy restoring spring mechanism for controlling deceleration of the shutter blades and assisting in acceleration of the blades.

It is a still further object of the invention to provide a high speed shutter for use in connection with ballistic cameras wherein the shutter blades are driven from the outside perimeter of the apparatus by a serially connected double linkage system having one half of the links moving in one direction and the other half moving in the opposite direction to cancel acceleration forces and thereby minimize vibration.

It is a still further object of the invention to provide a radial vane shutter having the shutter blades driven at the outer perimeter thereof by a linkage system as described above wherein each shutter blade is pivoted by a blade crank connected to the linkage system and the linkage system itself is actuated by a main blade crank connected to one of the shutter blades, the main blade crank being pivoted by a high speed intermittent clutch driven by a continuously rotating source.

It is a still further object of the invention to provide a radial vane shutter having an outer perimeter linkage system of the type described above having individual blade cranks for each of the shutter blades, including a main blade crank for actuating the linkage system and the remaining blade cranks and including a restoring spring mechanism associated with the main blade crank arm for storing and returning energy to the shutter drive system each cycle of operation, the spring mechanism decelerating the shutter blades at the end of each half cycle to store energy therein and returning the stored energy to the system by accelerating the shutter blades at the beginning of the next half cycle.

It is a still further object of the invention to provide a high speed intermittent clutch actuated by a continuously rotating source such as an electric motor.

It is a still further object of the invention to provide a high speed intermittent clutch actuated by a continuously rotating source for intermittently operating a high speed shutter in combination with a spring mechanism for absorbing and returning energy to the system during each cycle of operation in a manner to decrease the total power required of the continuously rotating source.

It is a still further object of the invention to provide a high speed roller cam clutch having an internal secondary shock absorber, coupled with a floating latch mechanism to produce consistent latching of the cam at speeds of 5000 r.p.m.

Other objects and features of novelty of the present invention will be specifically pointed out or will otherwise become apparent when referring, for a better understanding of the invention, to the following description taken in conjunction with the accompanying drawings, wherein.

Figure 1:
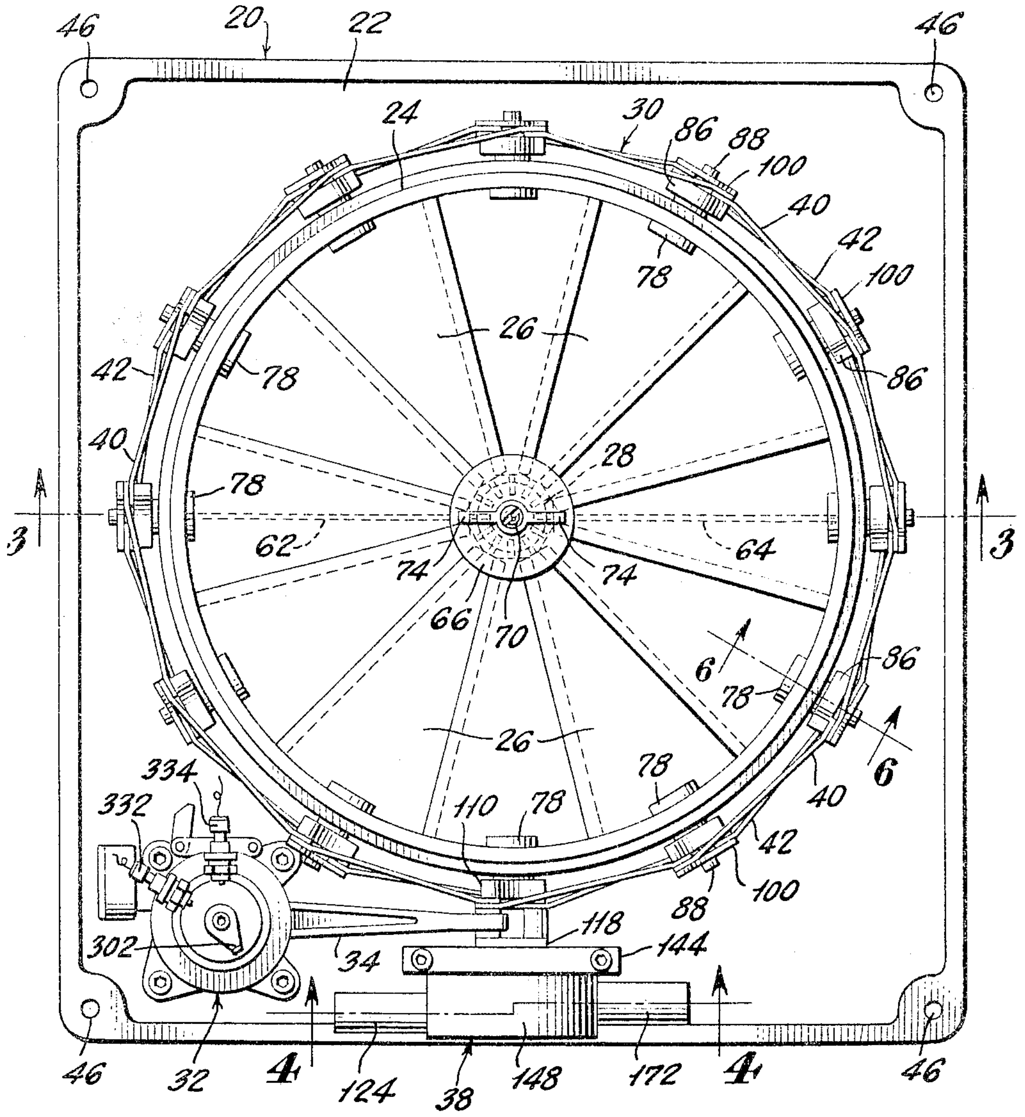
FIG. 1 is a plan view of a radial vane shutter embodying features of the present invention with the cover removed.
Figure 2:
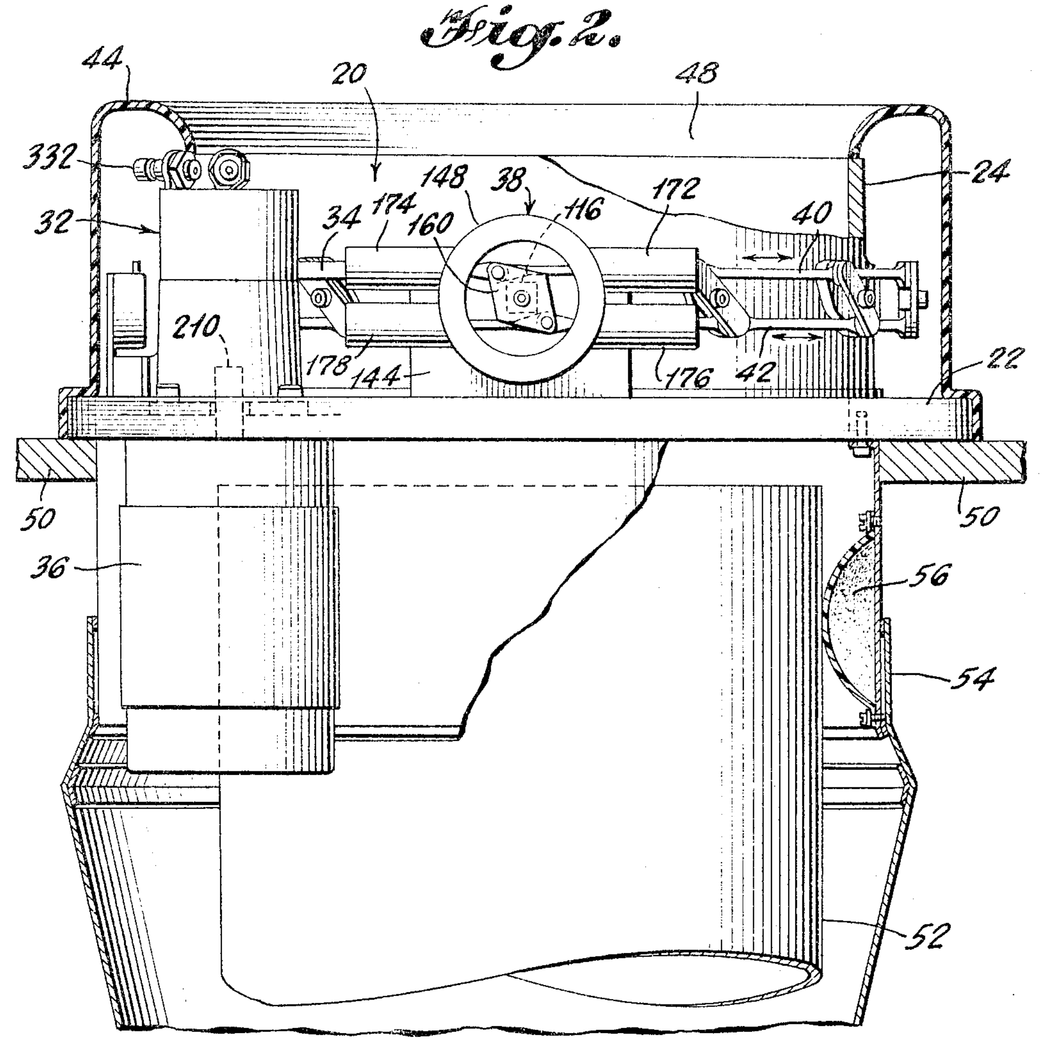
FIG. 2 is a side view, partly in section, of the shutter illustrated in FIG. 1 with the cover mounted in position.
Figure 3:
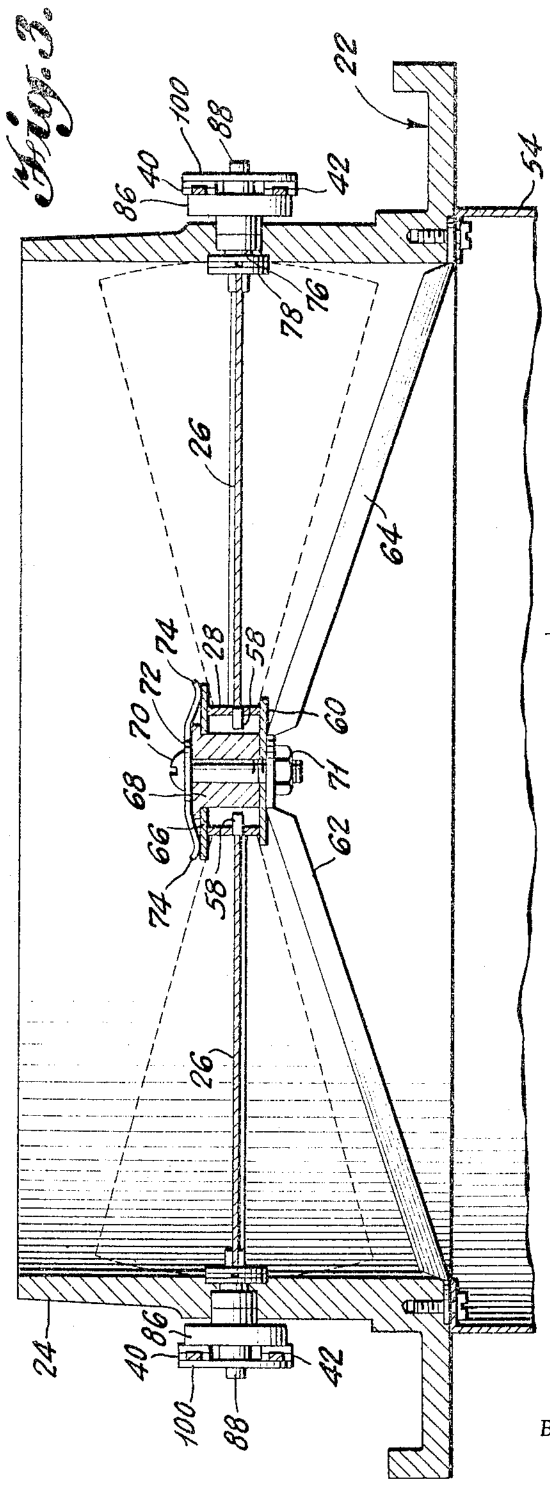
FIG. 3 is an enlarged sectional view taken along the line 3—3 of FIG. 1.
Figure 4:
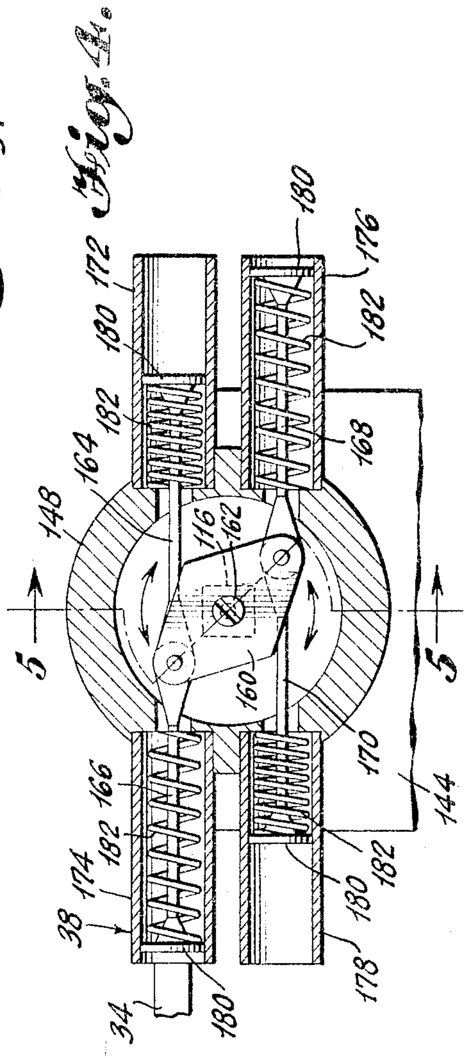
FIG. 4 is an enlarged sectional view taken along the line 4—4 of FIG. 1.
Figure 5:
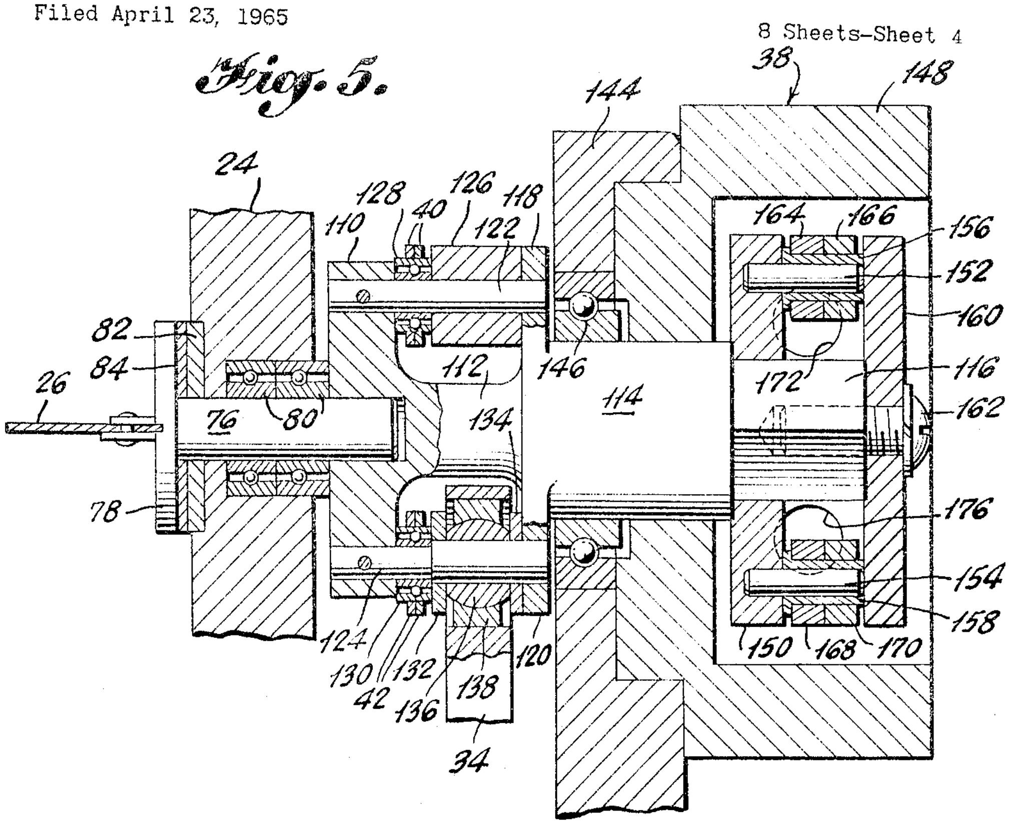
FIG. 5 is an enlarged sectional view taken along the line 5—5 of FIG. 4.

Referring to FIGS. 1–3, a radial vane shutter 20 is illustrated which embodies features of the present invention, and which can be used with ballistic cameras having long focal lengths or focused at infinity. External mounting techniques with vibration isolators are preferably used to independently mount the shutter in front of the camera barrel for optimum results. One mounting technique presently being used is to support the shutter on counterbalance pivot arms pivotally connected to a rotatable spherical dome associated with the camera in a manner to permit maximum vibration isolation from the camera barrel. However, since the present invention is not concerned with the particular mounting technique employed, a specific mounting arrangement will not be described in detail.

The shutter 20 briefly comprises a cylindrical housing 24 having a radially projecting base flange 22 on the lower end thereof. A plurality of pie-shaped shutter blades 26 are pivotally mounted within the cylindrical housing 24 for pivotal movement between the closed position illustrated in FIGS. 1 and 3, wherein one radial edge of each blade overlaps the radial edge of the adjacent blade, and the open position illustrated in phantom in FIG. 3 wherein each blade has pivoted through 90°. The inner end of each blade is rotatably journaled on a floating ring 28 and the outer end of each blade is rotatably journaled on the cylindrical housing 24, as will be described in greater detail hereinafter. The blades are opened and closed by a double, serially connected linkage mechanism 30 encircling the cylindrical housing 24 and interconnecting each of the blades. A high speed intermittent clutch 32 is mounted on the base flange 22 and connected to the linkage mechanism 30 by a main drive crank 34, as best seen in FIG. 1. The clutch 32 is actuated by a continuously rotating source, such as an electric motor 36 mounted on the opposite side of the base flange 22 in coaxial alignment with the clutch 32. A spring mechanism 38 which constitutes an important feature of the invention is connected to the linkage mechanism 30 for absorbing and returning energy to the drive system each cycle of operation, as will be described in greater detail hereinafter.

As most clearly illustrated in FIGS. 1 and 2, the linkage mechanism 30 includes a set of serially connected links 40 which move in one direction in response to movement of the main drive crank 34 and a second set of serially connected links 42 which move in the opposite direction so as to cancel acceleration forces and thereby minimize vibration. The links 40 and 42 are connected to blade cranks for pivoting the blades 26 as will be described and are also connected to a main blade crank to which the main drive crank 34 is connected. With this arrangement, reciprocation of the drive crank 34 oscillates the main blade crank, which in turn oscillates the other blade cranks through the linkage mechanism 30 to open and close the shutter blades 26.

The overall operation of the shutter 20 will now be described briefly before describing the construction of the shutter 20 in detail. A suitable trigger pulse is applied to a small solenoid for retracting a spring loaded stop latch to allow the clutch 32 to engage the continuously rotating electric motor 36 and rotate one half revolution therewith. This drives the main drive crank to pivot the main blade crank through 90° which in turn pivots each of the other blade cranks through the links 40 and 42 to pivot the blades 26 from closed to open position. After one half revolution, the clutch automatically latches and disengages itself from the continuously rotating electric motor until a subsequent trigger signal is applied to the aforementioned solenoid to start the return half of the cycle to pivot the blades back to their closed position. The trigger signals can be applied to the clutch solenoid under manual control, or programmed as will be described to provide high speed operation of the shutter blades up to 55 or more cycles per second.

The mechanical drive system for the shutter blades uses two elementary principles. The first principle is to utilize the energy of a rotating motor to provide the instantaneous force of large accelerations, and the second is to store as much energy as practical in restoring springs located in the spring mechanism 38. Therefore, the prime source of energy is the continuously rotating electric motor, with a secondary energy being supplied by the restoring springs which absorb and return energy to the drive system during the opening and closing phase of each cycle in a manner to decrease the total power required of the motor. At this point it is noted that the term "cycle" is employed to designate the complete pivotal movement of the shutter blades from closed to open and back to closed position.

A cover 44 for the shutter 20 is illustrated in FIG. 2. The cover is rectangular, with one end thereof fixed to the base flange 22, suitable bolt holes 46 for this purpose being shown in FIG. 1. The other end of the cover terminates in a radially inwardly extending lip 48 closely overlying the end of the cylindrical housing 24. As best seen in FIG. 2, the shutter 20 is mounted on a pair of supporting arms 50 for pivotally mounting the shutter on a rotatable spherical dome in a manner to provide maximum vibration isolation from the camera barrel 52 which projects into a cylindrical metal shroud 54 mounted on the supporting arms 50. A plurality of soft rubber pads 56 may be provided on the inner surface of the cylindrical shroud 54 to resiliently maintain the camera barrel in position. A conventional cloth shroud (not shown) may also be provided for connecting the metal shroud 54 to the camera barrel 52 to keep out light.

Referring specifically to FIGS. 1 and 3, it will be observed that each of the shutter blades 26 has a pin 58 projecting from the inner end thereof which is rotatably supported in the floating ring 28. The floating ring 28 in turn is fixed on a disc 60 which is supported by a pair of radial struts 62 and 64 having the outer ends thereof fixed to the cylindrical housing 24. The struts are sufficiently flexible to avoid binding of the pins 58 in the ring 28 which, therefore, is characterized as a floating ring. A cover plate 66 is provided on the other end of the floating ring 28 with a bushing 68 extending therethrough to enable the assembly to be bolted together by a bolt 70 and a nut 71. A washer 72 having spring fingers 74 projecting therefrom may be locked beneath the head of the bolt to maintain the assembly tight and free from vibrating loose and rattling. The entire assembly provides a good light tight, floating central support for the inner ends of the blades.

Figures 6, 14:
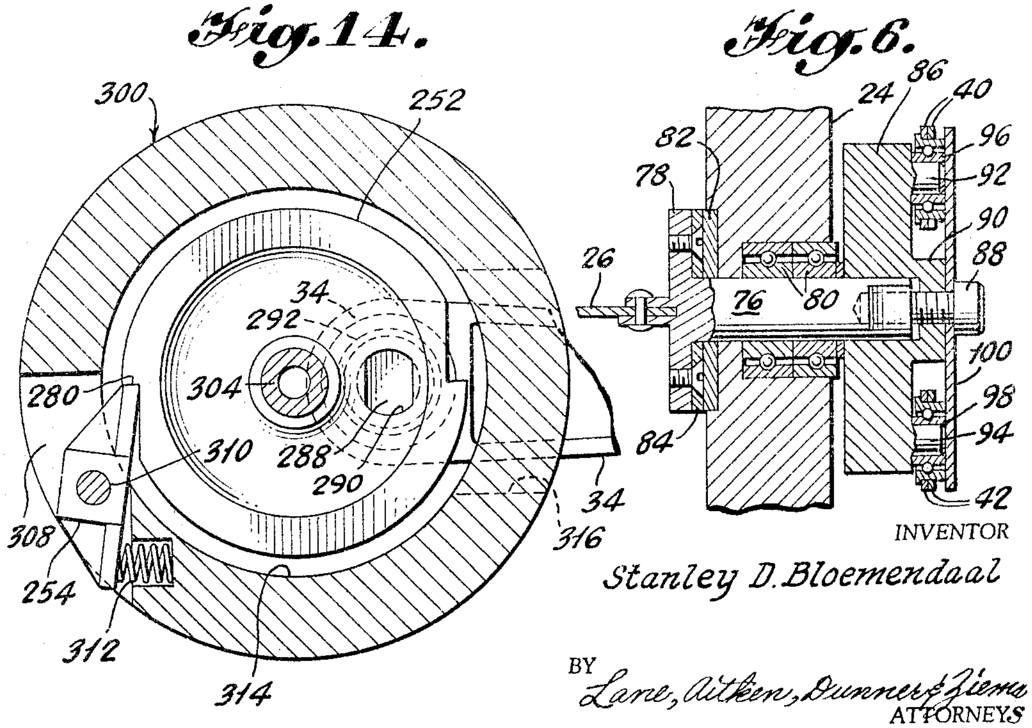
FIG. 6 is an enlarged sectional view taken along the line 6—6 of FIG. 1.
FIG. 14 is a sectional view taken along the line 14—14 of FIG. 10.
Figure 7:
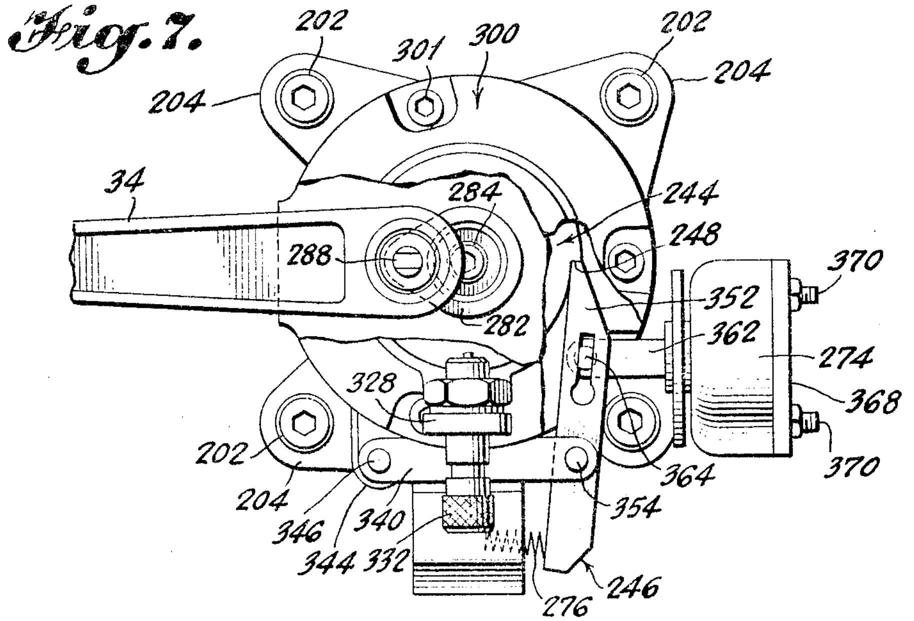
FIG. 7 is an enlarged front end view of the clutch as illustrated in FIG. 1 with portions thereof broken away for greater clarity.
Figure 8:
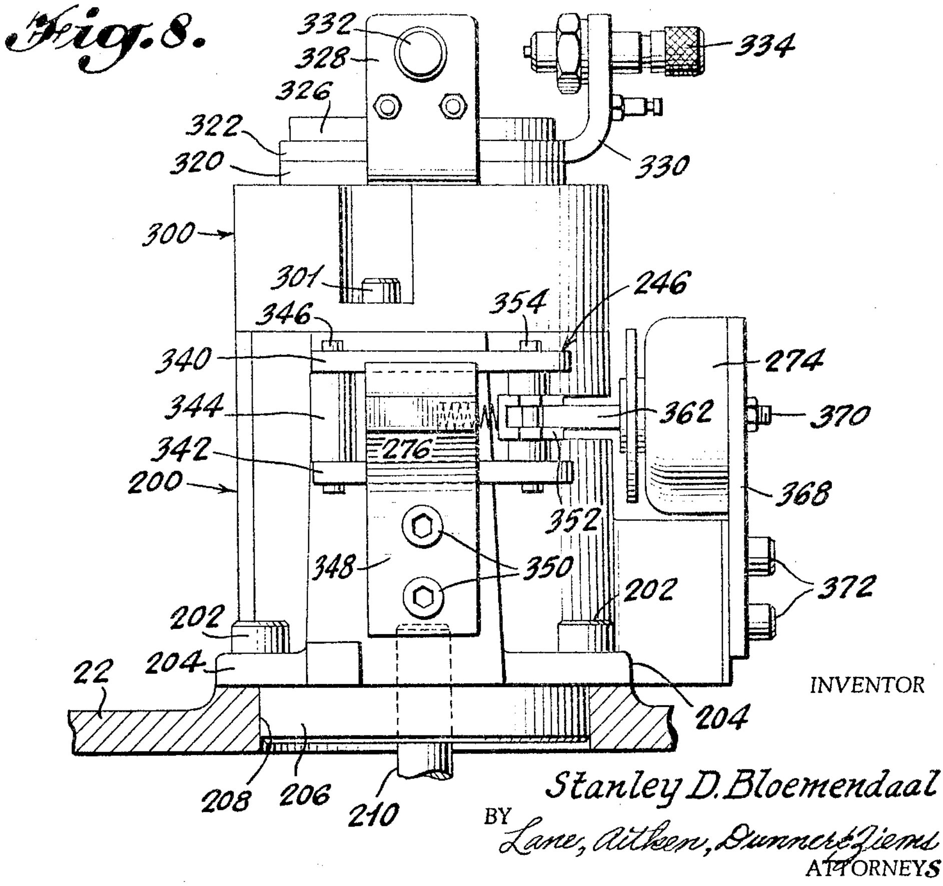
FIG. 8 is a view of one side of the clutch of FIG. 7.

As most clearly illustrated in FIGS. 3 and 6, a pin 76 having a flange 78 on the inner end thereof is fixed on the outer end of each of the shutter blades 26 and rotatably journaled in the cylindrical housing 24 by a pair of ball bearings 80. A washer-shaped bearing plate 82 is fixed within a suitable counter-bore in the cylindrical housing 24 and a low friction washer 84 is fixed on the flange 78 to cooperate with the bearing washer 82 to provide a thrust bearing for reducing friction between the flange 78 and the cylindrical housing 24. A blade crank 86 is bolted to the end of the pin 76 by a bolt 88 passing through a central boss 90 on the blade crank 86. A pin 92 projects axially from one end of the blade crank 86 and a pin 94 projects axially from the other end thereof. The inner race of a ball bearing 96 is fixed on the pin 92 and the inner race of a ball bearing 98 is fixed on the pin 94. The adjacent ends of a pair of links 40 are connected to the outer race of the ball bearing 96 and the ends of a pair of links 42 are connected to the outer race of the ball bearing 98. The opposite ends of the links, of course, are connected to the outer races of similar ball bearings on the adjacent blade cranks to serially connect the blade cranks together as best seen in FIG. 2. An elongated cover plate 100 is secured to the central boss 90 by the bolt 88 and extends over the ball bearings 96 and 98 to prevent the links 40 and 42 from slipping off of the ball bearings. As best seen in FIG. 1, the end portions of the links 40 and 42 which are connected to the ball bearings 96 and 98, respectively, are bent slightly so as to be perpendicular to the axes of the ball bearings.

Referring specifically to FIGS. 1, 2, 4 and 5, the construction of the main blade crank having the main drive crank 34 connected thereto and the spring mechanism 38 associated therewith will now be described in detail. A pin 76 having a flange 78 thereon is connected to the outer end of the blade 26 as just described in connection with the other blades, and the pin 76 is rotatably journaled in the cylindrical housing 24 by bearings 80 with a bearing plate 82 and thrust washer 84 provided as before to reduce friction between the flange 78 and the cylindrical housing 24. A main blade crank 110 is fixed on the end of the pin 76 and has a stub shaft 112 projecting therefrom in coaxial alignment with the pin 76. The stub shaft 112 has an intermediate portion 114 of larger diameter and an end portion 116 of slightly smaller diameter with flanges 118 and 120 projecting laterally from the intermediate portion 114. A pin 122 extends between and is secured to one end of the main blade crank 110 and the flange 118 and a pin 124 extends between and is secured to the other end of the main blade crank and the flange 120. A spacer 126 is positioned beneath the flange 118 to axially position a ball bearing 128 having the inner race thereof fixed to the pin 122 and the adjacent ends of links 40 connected to the outer race of the ball bearing. A ball bearing 130 is similarly mounted on the pin 124 with the adjacent ends of links 42 connected to the outer race thereof. A pair of washers 132 and 134 having a truncated ball element 136 therebetween are mounted on the pin 124 between the ball bearing 130 and flange 120. An outer race member 138 is journaled on the truncated ball element 136 and fixed within the end of the main drive crank 34 which is reciprocated by the clutch 32. With this construction, reciprocation of the main drive crank 34 by the clutch oscillates the main blade crank 110 to open and close the shutter blade 26 connected thereto and to oscillate the remaining blade cranks through the serially connected links 40 and 42 to open and close the blades connected thereto. The ball joint provided by the truncated ball element 136 and outer race member 138 compensates for misalignment between the main drive crank 34 and the pin 124.

The spring mechanism 38 for absorbing and returning energy to the drive system during each cycle is associated with the main blade crank 110. It comprises a supporting plate 144 which is suitably fixed to the base flange 22 and has a ball bearing 146 fixed therein for rotatably supporting the intermediate portion 114 of the shaft 112. A cup-shaped member 148 is fixed on the supporting plate 144 in position to encircle the end portion 116 of the shaft 112. A crank arm 150 is fixed on the end portion 116 against the shoulder defined by the intermediate portion 114 and a pair of pins 152 and 154 project axially from the ends of the crank arm. Bushings 156 and 158 are positioned on the pins 152 and 154, respectively, and are pressed axially against the crank arm 150 by a cover plate 160 bolted to the end of the end portion 116 by a bolt 162. The ends of four piston rods 164–170 are journaled on the bushings 156 and 158 and the rods project therefrom into tubular elements 172–178, respectively, fixed to and projecting from the cup-shaped member 148 as most clearly illustrated in FIG. 4. Flanged heads 180 are provided on the outer ends of each of the piston rods 164–170 and suitable coil springs 182 are positioned within the tubular elements 172–178 in position to be compressed by oscillation of the crank arm 150. Specifically, with the main blade crank and the shutter blade fixed thereto in the position illustrated, the springs within the tubular elements 172 and 178 are fully compressed and the remaining two springs are relaxed or just slightly compressed. When the solenoid is tripped to unlatch the clutch 32 and engage it with the continuously rotating motor 36, the compressed springs within the tubular elements 172 and 178 provide stored spring energy for assisting the clutch in pivoting the main blade crank 110 in a clockwise direction as viewed in FIG. 4. Near the end of the stroke of the drive crank 34, the compression of the springs within the tubular elements 176 and 174 will come into play to decelerate the system and thus assist the clutch to consistently automatically latch itself after one half revolution. The main blade crank is retained in the extreme clockwise position until the next trigger signal is applied to the solenoid to unlatch the clutch and initiate the return half of the cycle. The clutch is actually latched just before the drive crank 34 reaches a dead center position. Therefore it is latched at the end of the first half of the cycle just before the pair of springs 182 are fully compressed. When the next trigger signal is received by the solenoid to unlatch the clutch, the electric motor is engaged to initially drive the main drive crank 34 over center at which point the compressed springs 182 begin to assist the crank arm 34 in pivoting the main blade crank 110 to open or close the shutter blades.

Referring to FIGS. 7–14, the construction of the clutch 32 will now be described in detail. The clutch comprises a cylindrical clutch housing 200 suitably secured to the base flange 22, such as by four bolts 202 projecting through four corner flanges 204 near the lower end of the clutch housing. A reduced end portion 206 on the clutch housing is fitted within an opening 208 in the flange 22 and the output shaft 210 of the electric motor 36 projects through the opening 208 into the clutch housing 200. The motor shaft 210 is coupled to a clutch hub 212 through an alignment coupling 214 secured to the end of the clutch hub and a coupling 216 secured to the motor shaft 210 by a set screw 218.

Figure 10:
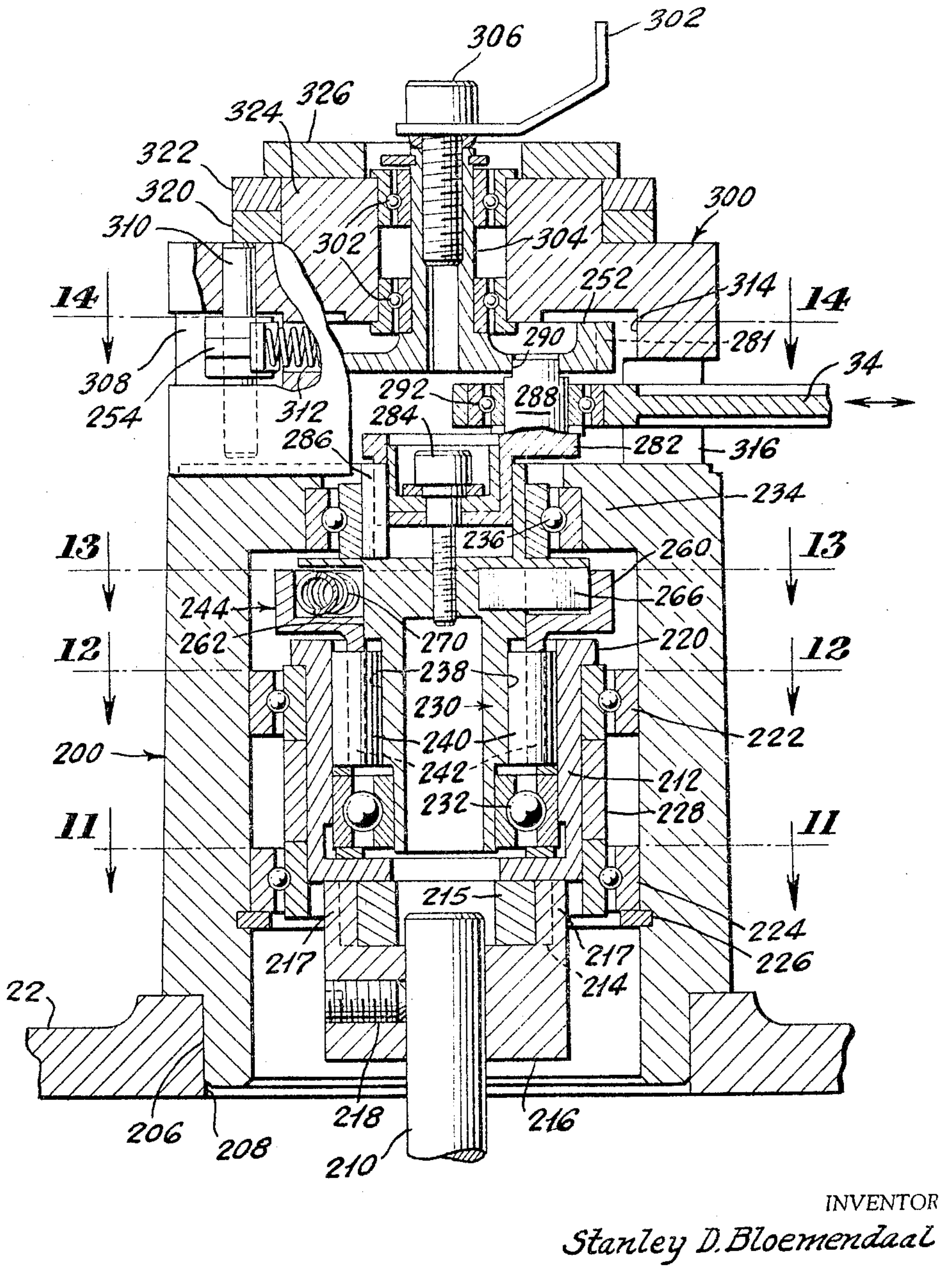
FIG. 10 is an enlarged longitudinal sectional view of the clutch.
Figure 12:
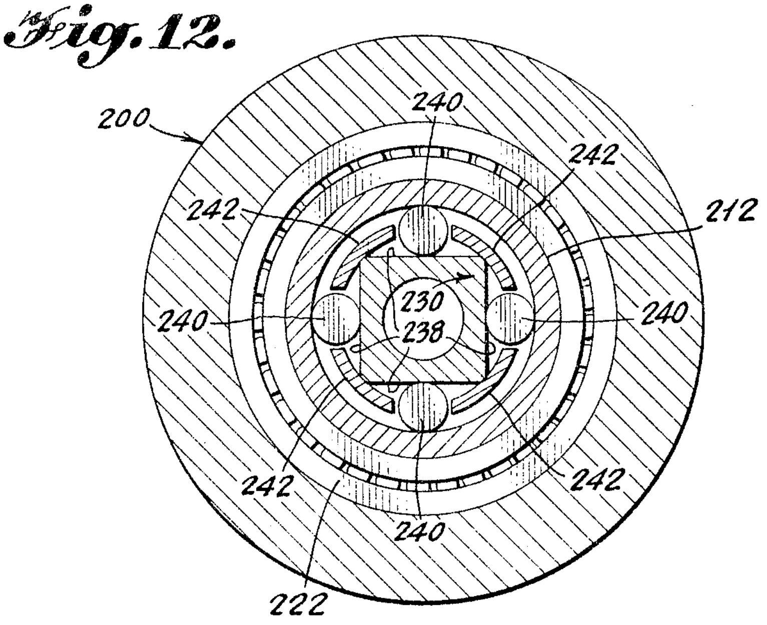
FIG. 12 is a sectional view taken along the line 12—12 of FIG. 10.
Figure 13:
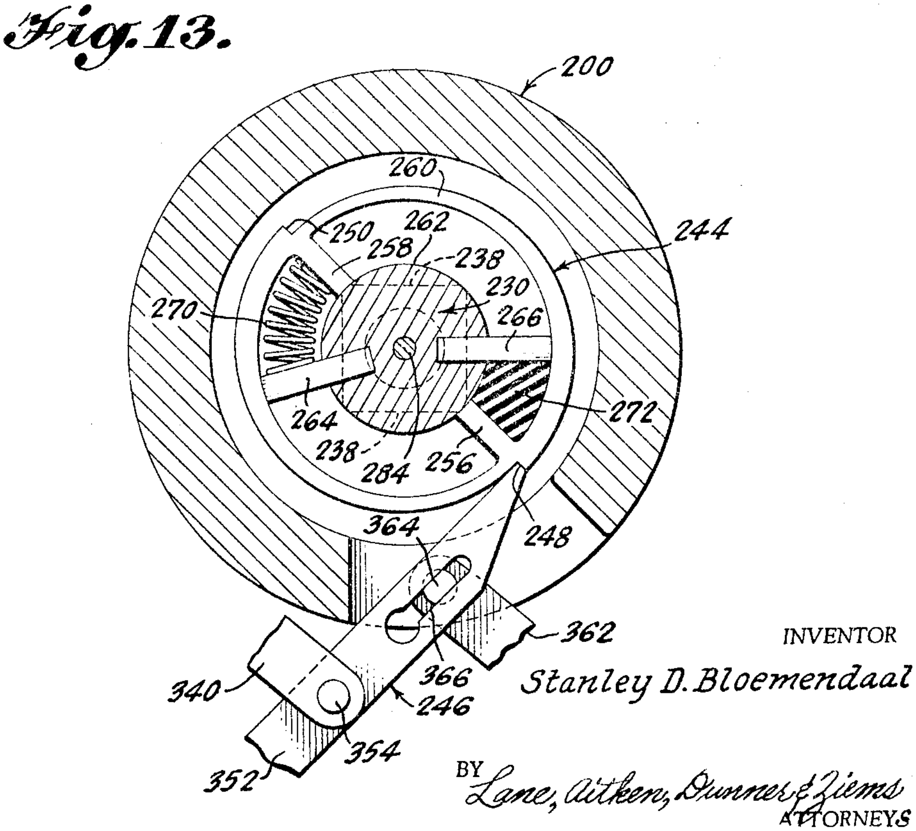
FIG. 13 is a sectional view taken along the line 13—13 of FIG. 10.

As most clearly shown in FIG. 10, the upper end of the clutch hub 212 has a radially projecting flange 220 which engages the inner race of a ball bearing 222 having the outer race thereof fixed within the clutch housing 200. The ball bearing 222 and a second ball bearing 224 rotatably journal the clutch hub 212 in the clutch housing. The outer race of the ball bearing 224 is fixed against axial movement by a snap ring 226 and the two ball bearings are maintained in proper spaced relation by a spacer 228. The clutch hub is continuously rotated in a clockwise direction by the motor shaft when viewed from the front end, which is the end furthest removed from the motor. Inside the clutch hub is a cam 230 having one end thereof rotatably journaled in the clutch hub by a ball bearing 232 and the other end rotatably journaled in a front wall 234 of the clutch housing 200 by a ball bearing 236. The cam 230 has four flats 238 thereon as best seen in FIGS. 12 and 13, and four rollers 240 are positioned on the cam flats 238 by fingers 242 which project rearwardly from a roller cage 244. When the clutch is disengaged, the rollers 240 are held near the center of the cam flats 238 by the roller cage to maintain a dimensional clearance between the rollers, cam 230 and clutch hub 212, thereby allowing the clutch hub to rotate freely with the motor shaft 210 without rotating the cam 230. This disengaged condition is maintained by two latches. A stop latch mechanism 246 engageable with diametrically opposed shoulders 248 and 250 on the surface 260 (FIG. 13) of the roller cage keeps the cam 230 in position with the cooperation of a back stop cam 252, back stop latch 254 and drive crank 34 which are all internally linked to the roller cage as will be described in greater detail hereinafter.

The roller cage 244 is mounted on the cam 230 by radially inward projecting fingers 256 and 258 which are fixed to the outer wall 260 of the roller cage having the latching shoulders 248 and 250 thereon. The inner ends of the fingers 256 and 258 slidably engage a cylindrical surface 262 on the cam 230 between the ball bearing 236 and the rollers 240 (FIG. 10). Another pair of fingers 264 and 266 have the inner ends thereof fixed in the cam 230 with the outer ends thereof slidably engaging the inner surface of the wall 260 of the roller cage. A coil spring 270 is interposed between the fingers 258 and 264 and a rubber element 272 or the like is interposed between the fingers 258 and 266 to resiliently bias the roller cage 244 in a clockwise direction relative to the cam 230 as viewed in FIG. 13. This enables the cam 230 to continue to rotate in a clockwise direction through a small angle when one of the shoulders 248 or 250 strike the stop latch mechanism 246 to stop rotation of the roller cage 244, as will be described.

To engage the clutch, the stop latch mechanism 246 is retracted by a solenoid 274 (FIG. 7) and the spring 270 (which is compressed) rotates the roller cage relative to the cam 230 to force the rollers 240 to wedge against the rotating clutch hub 212 and the outer portions of the flats 238 to thereby cause the cam 230 to rotate with the clutch hub. To disengage the clutch, the solenoid 274 is deenergized to enable a return spring 276 (FIG. 7) to force the stop latch mechanism 246 back against the outer surface of the roller cage 244 in position to engage the approaching shoulder 248 or 250 to stop the roller cage. Because of the inertia in the system, the clutch cam 230 and back stop cam 252, which are internally linked together for rotation with one another as previously mentioned, both rotate about 4° more than the roller cage 244 by compressing the spring 270 and the rubber element 272. This relative movement forces the rollers 240 back to the middle of the cam flats 238 and enables the back stop latch 254 to snap into place against a shoulder 280 on the back stop cam (FIG. 14) and thus maintain the roller cage 244 in a position relative to the cam 230 wherein the rollers 240 are in the middle of the cam flats 238 so as to hold the cam 230 disengaged from the clutch hub 212 as previously described. The back stop cam 252 also has a shoulder 281 thereon diametrically opposite the shoulder 280 for cooperating with the shoulder 250 on the roller cage.

A crank arm 282 is fixed to the cam 230 by a bolt 284 and keyed to the portion of the cam on which the inner race of the ball bearing 236 is fixed by a key 286 (FIG. 10). A pin 288 projects axially from the radially outer end of the crank 282 into an opening 290 in the face of the back stop cam 252 so as to link the back stop cam for rotation with the cam 230 as previously described. The end of the main drive crank 34 is journaled on the pin 288 by a ball bearing 292. Thus rotation of the cam 230 by the clutch hub rotates the crank 282 to drive the main drive crank as previously described to pivot the main blade crank 110 through one-half of a cycle (90°) each time the clutch rotates one half revolution.

The back stop cam 252 is rotatably journaled in a back stop housing 300 by a pair of ball bearings 302 having their inner races fixed on a hub 304 projecting from the back stop cam. The back stop housing 300 is mounted on the end of the clutch housing 200 by a plurality of bolts 301 and coaxially aligned with the clutch housing 200 and the motor shaft 210. A pointer 302 is fixed to the hub 304 of the back stop cam 252 by a bolt 306 so as to rotate with the back stop cam for energizing a magnetic pickup, as will be described in greater detail hereinafter. The back stop latch 254 is positioned within a recess 308 provided in the wall of the back stop cam housing 300 and is pivotally mounted on a pin 310 fixed in the housing and spanning the recess 308. A suitable spring 312 is provided for resiliently biasing the back stop latch against the cam surface of the back stop cam 252 as most clearly illustrated in FIG. 14. A counterbose 314 is provided in the back stop cam housing as most clearly illustrated in FIG. 10 in position to cooperate with the upper end of the clutch housing 200 to define a chamber large enough to accommodate rotation of the back stop cam 252 and the crank arm 282. A suitable opening 316 is provided in the wall of the back stop cam housing to enable the main drive crank 34 to pass therethrough.

As best seen in FIGS. 7–10, a pair of washer-shaped elements 320 and 322 are fixed on a boss 324 on the upper end of the back stop cam housing 300 by a washer-shaped plate 326 bolted or otherwise secured to the end of the boss 324. As will be observed in FIG. 10, the washer-shaped element 320 also retains the pin 310 in position in a manner to enable the pin to be removed when the washer-shaped elements 320 and 322 are removed. A right-angle flange 328 is provided on the washer-shaped element 320 and a similar right-angle flange 330 is provided on the washer-shaped element 322. Suitable magnetic pickups 332 and 334 are mounted on the flanges 328 and 330, respectively, in position to be actuated by the end of the rotating pointer 302 to provide electrical signals at each of the angular positions at which the magnetic pickups are located. The angular positions of the magnetic pickups can be easily adjusted by loosening the plate 326, rotating the washer-shaped elements 320 and 322 to the desired positions and then re-tightening the plate 326.

Figure 9:
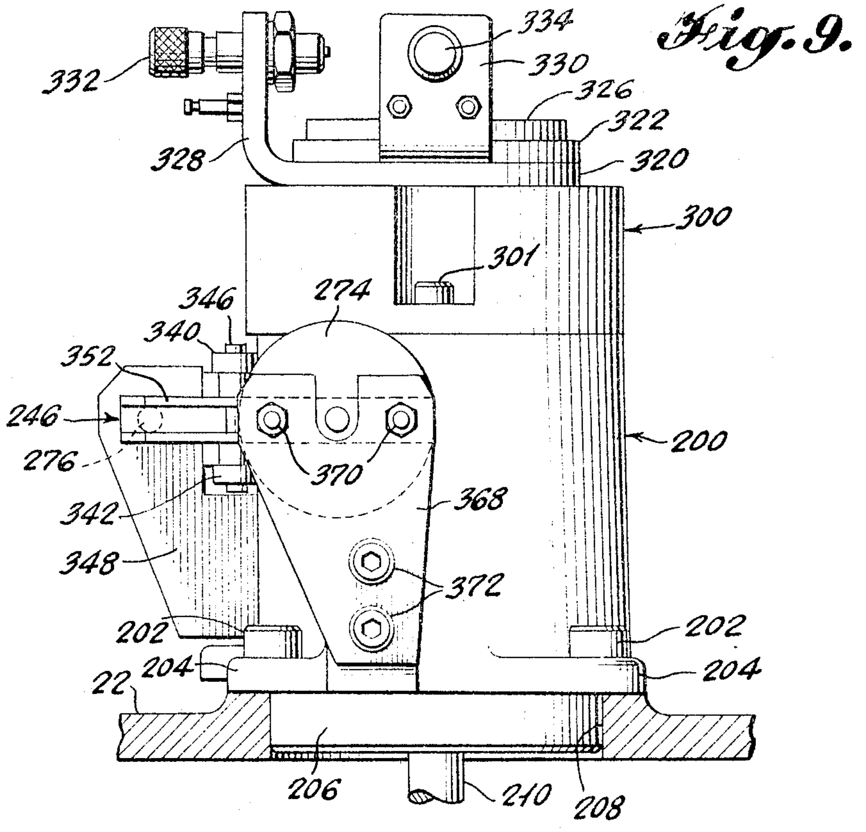
FIG. 9 is a view of another side of the clutch of FIG. 7.
Figure 11:
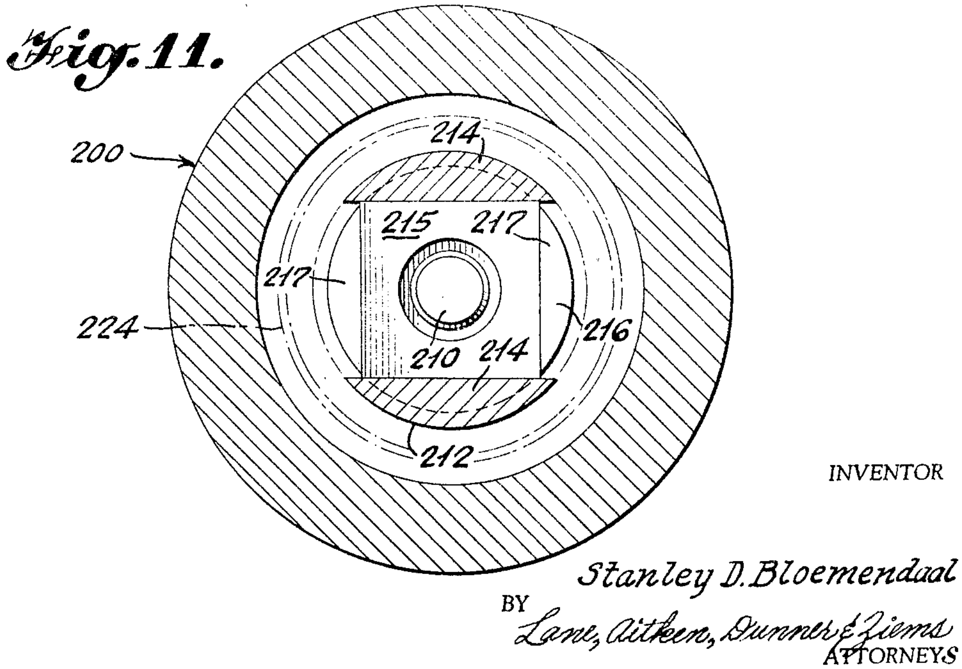
FIG. 11 is a sectional view taken along the line 11—11 of FIG. 10.

The stop latch mechanism 246 is most clearly illustrated in FIGS. 7–9 and 13. It comprises a first pair of links 340 and 342 pivotally mounted on a lug 344 on the clutch housing by a pin 346. A stop plate 348 is bolted to the clutch housing by a pair of bolts 350 in position to overlie the links 340 and 342 to limit their pivotal movement away from the clutch housing. A latch finger 352 is pivotally supported between the links 340 and 342 on a pin 354 and the end of the latch finger is resiliently biased against the outer surface of the roller cage 244 by the spring 276. The pivotal movement of the latch finger 352 is controlled by the solenoid 274 having an armature 362 pivotally connected to the latch finger 352 by a pin 364 (FIG. 7) extending through a suitable slot 366 in the latch finger. The armature 362 is spring biased outwardly to normally maintain the latch finger 352 against the outer surface of the roller cage and it is retracted to disengage the latch finger when the solenoid 274 is energized as previously described. The solenoid 274 is supported on a mounting plate 368 by a pair of bolts 370 and the mounting plate is fixed to the clutch housing 200 by a pair of bolts 372 (FIG. 9).

To operate the shutter 20, only the necessary power supplies and a programmed trigger source need be provided. In one embodiment of the invention wherein the shutter is cycled at a high frequency, the trigger source produces a positive trigger pulse of 4.8 volts and suitable circuitry is provided to pulse the solenoid 274 to retract the spring loaded latch finger 352 for approximately 3.5 milliseconds, which is enough time to allow the clutch to engage and rotate one half revolution to actuate the main drive crank 34 to open the shutter blades 26 and then de-energize the solenoid in time to snap the latch finger 352 into position to engage the other shoulder to stop the roller cake and disengage the cam 230. The next time the solenoid is pulsed for 3.5 milliseconds, the clutch will rotate another half revolution to return the shutter blades 26 to their closed position as illustrated in FIG. 1. In order to manually cock or latch the shutter blades 26 in an open or closed position, a suitable socket is provided in the head of the bolt 306 (FIG. 10) to enable an Allen wrench to be inserted therein to manually rotate the back stop cam 252, and therefore, the cam 230 and roller cage 244 internally linked to the back stop cam, to a latched position.

The latching mechanism preferably disengages the clutch cam 230 from the continuously rotating clutch hub 212 as previously described just before the main drive crank 34 reaches its extreme push or pull position, that is, just before the main drive crank reaches a dead center position. Just after the clutch is engaged, the energy restoring spring mechanism 38 begins to override or precess the clutch 230 so that by the time the shutter blade reaches 45° of angular displacement, the clutch cam is rotating about 4500 r.p.m., for example, when the clutch hub and motor shaft are rotating continuously at 3450 r.p.m. Clutch rotation continues, and the main drive crank 34 compresses the other two springs of the spring mechanism 38, eventually reducing the r.p.m. of the clutch cam 230 to coincide identically with that of the clutch hub and electric motor shaft. The main drive crank 34 is simultaneously nearing dead center, and in this manner the spring mechanism 38 effectively controls deceleration of the blades. The shutter blades remain latched in the fully open or closed position until the solenoid 274 is pulsed to start the next half cycle. If the solenoid is held energized as the clutch cam 230 approaches latching position, the shutter blades will travel through this position. Thus, by the simple expedient of controlling the length of time the solenoid 274 is energized, the clutch can be engaged and disengaged every half revolution or every full revolution to cause the shutter blades to operate through half cycles, or full cycles.

Camera exposure times (half light transmission) of four milliseconds are possible at repetition rate of slightly over 50 exposures per second. Shutter midpoint (half light transmission) is readily determined to accuracies of 100 microseconds by means of the signals produced by the magnetic pickups 332 and 334. For example, the two magnetic pickups may be spaced normally 54° apart corresponding to 27° before and 27° after the shutter blades are fully opened. As the magnetic pointer 302 passes the pickups at a rate of approximately 200 inches per second, a signal is generated to indicate the position of the shaft to which the pointer is attached. These two signals may be applied to the ballistic camera to define the shutter midpoint. If desired, the magnetic pickups also can be utilized to skip the latching at each half revolution so that the shutter blades open and close through a complete cycle each time the clutch is pulsed. For example, the solenoid 274 can be energized to unlatch the latch finger 352 and hold it unlatched until it is de-energized by a signal from one of the magnetic pickups, which signal is produced at an angular position of the clutch which ensures that the latch finger 352 will re-engage the cam surface of the roller cage 244 after the shoulder to be skipped has passed and in time to engage the next shoulder to latch the clutch after one complete revolution.

It is apparent that the construction of the shutter 20 emphasizes the requirement for rugged, reliable and high speed operation. Friction losses are minimized by using ball bearings at major pivot points. Highly stressed clutch parts are made from heat-treated tool steel and are hard chrome-plated for life and corrosion resistance. The cylinder housing 24 and flange is a precision machined aluminum sand casting. All mechanical and electronic parts are shrouded in the molded weather cover 44.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A radial vane shutter for use with a ballistic camera comprising a cylindrical housing, a plurality of pie-shaped shutter blades, means for pivotally mounting said shutter blades within said housing for pivotal movement between a closed position wherein the blades are prependicular to the axis of said cylindrical housing and block the passage of light therethrough and an open position wherein said blades are pivoted about 90° from said closed position to freely pass light through said cylindrical housing, linkage means encircling said cylindrical housing and connected to the outer end of each of said blades for pivoting the blades between said open and closed positions when the linkage means is actuated, high speed intermittent clutch means driven by a continuously rotating source for converting said continuous rotary motion to intermittent rotary motion, said clutch means including means for engaging said clutch means with said continuously rotating source for rotation thereby through a predetermined angle and disengaging said clutch means after it rotates through said predetermined angle, and drive means for connecting said clutch means to said linkage means to pivot said blades between said open and closed positions.

2. The shutter as defined in claim 1 including light tight ring means for pivotally supporting the inner end of each of said blades, said ring means comprising a ring, means for supporting said ring concentrically within said housing, each of said blades having a projecting pin on the inner end thereof rotatably journaled in said ring, and cover means for closing off said ring to block the passage of light therethrough.

3. The shutter as defined in claim 1 including a ring, strut means flexibly supporting said ring concentrically within said cylindrical housing in a manner to enable the ring to float a limited amount relative to said cylindrical housing, each of said blades having a pin projecting from the inner end thereof rotatably journaled in said ring, and a cover plate closing off one end of said ring to prevent light passing therethrough.

4. A radial vane shutter for use with a ballistic camera comprising a cylindrical housing, a plurality of pie-shaped shutter blades, means for pivotally mounting said shutter blades within said housing for pivotal movement between a closed position wherein the blades are perpendicular to the axis of said cylindrical housing and block the passage of light therethrough and an open position wherein said blades are pivoted about 90° from said closed position to freely pass light through said cylindrical housing, linkage means encircling said cylindrical housing and connected to the outer end of each of said blades for pivoting the blades between said open and closed positions when the linkage means is actuated, high speed intermittent clutch means driven by a continuously rotating source for converting said continuous rotary motion to intermittent rotary motion, drive means for connecting said clutch means to said linkage means to pivot said blades between said open and closed positions, said linkage means comprising: a blade crank connected to the outer end of each of said blades, a first set of serially connected linkages encircling said cylindrical housing and interconnecting corresponding ends of said blade cranks, and a second set of serially connected links encircling said housing and interconnecting the other ends of said blade cranks and wherein said drive means is connected to one end of said blade cranks and drives the remaining blade cranks through said serially connected links, the first set of links moving in one direction and the second set of links moving in the opposite direction in response to pivotal movement of said one blade crank to cancel acceleration forces and thereby minimize vibration.

5. The shutter as defined in claim 4 wherein said drive means comprises a main drive crank having one end thereof pivotally connected to one end of said one blade crank and the other end thereof pivotally connected to said clutch means, said drive crank being reciprocated by said clutch means to oscillate said one blade crank.

6. The shutter as defined in claim 4 wherein said spring means is connected to said one blade crank for decelerating pivotal movement thereof in each direction near the end of the pivotal movement thereof and accelerating pivotal movement of the blades during the beginning of the pivotal movement thereof.

7. The shutter as defined in claim 6 wherein said spring means comprises first spring means compressed by pivotal movement of said one blade crank in one direction and second spring means compressed by pivotal movement of said one blade crank in the other direction, the compression of said first and second spring means decelerating the pivotal movement of said one blade crank and producing stored energy for assisting the acceleration of said one blade crank during the initial portion of its pivotal movement.

8. The shutter as defined in claim 4 including a crank arm mounted on said one blade crank for pivotal movement therewith, a housing surrounding said crank arm and fixed to said cylindrical housing, first and second opposed springs interposed between said housing and one end of said crank arm, third and fourth opposed springs interposed between the other end of said crank arm and said housing, said first and third springs being compressed by pivotal movement of said crank arm in one direction and said second and fourth springs being compressed by pivotal movement of said crank arm in the other direction whereby the compressed springs assist in accelerating pivotal movement of said blades during the initial portion of pivotal movement thereof in each direction and decelerate pivotal movement of said blades near the end of the pivotal movement thereof in each direction.

9. The shutter as defined in claim 1 wherein said drive means comprises a main drive crank having one end thereof pivotally connected to said linkage means and the other end thereof pivotally connected to said clutch means for reciprocation thereby.

10. A radial vane shutter for use with a ballistic camera comprising a cylindrical housing, a plurality of pie-shaped shutter blades, means for pivotally mounting said shutter blades within said housing for pivotal movement between a closed position wherein the blades are perpendicular to the axis of said cylindrical housing and block the passage of light therethrough and an open position wherein said blades are pivoted about 90° from said closed position to freely pass light through said cylindrical housing, linkage means encircling said cylindrical housing and connected to the outer end of each of said blades for pivoting the blades between said open and closed positions when the linkage means is actuated, high speed intermittent clutch means driven by a continuously rotating source for converting said continuous rotary motion to intermittent rotary motion, drive means for connecting said clutch means to said linkage means to pivot said blades between said open and closed positions, said clutch means comprising a clutch hub keyed for continuous rotation with said continuously rotating source, a clutch cam, means for releasably engaging said clutch cam with said clutch hub for rotation therewith, and means for drivingly connecting said clutch cam to said drive means to pivot said blades when said clutch cam is engaged with said clutch hub.

11. The shutter as defined in claim 10 including solenoid operated means shiftable between first and second positions for controlling engaging and disengaging of said clutch cam with said clutch hub, said clutch cam being engaged with said clutch hub for rotation therewith as long as said solenoid means is in said first position and being automatically disengaged from said clutch hub when said solenoid is in said second position.

12. A shutter for use with a ballistic camera comprising a housing having a large aperture therein, a plurality of shutter blades, means for pivotally mounting said shutter blades on said housing for pivotal movement between a closed position wherein the blades cover said aperture to block the passage of light therethrough and an open position wherein said blades are pivoted about 90° from said closed position to freely pass light through said aperture, linkage means connected to the end of each of said blades for pivoting the blades between said open and closed positions when the linkage means is actuated, said linkage means comprising a blade crank connected to the outer end of each of said shutter blades, a first set of serially connected linkages interconnecting corresponding ends of said blade cranks, and a second set of serially connected linkages interconnecting the other ends of said blade cranks, the first set of links moving in one direction and the second set of links moving in the opposite direction in response to pivotal movement of said blade cranks to cancel acceleration forces and thereby minimize vibration, high speed intermittent clutch means driven by a continuously rotating source for converting said continuous rotary motion to intermittent rotary motion, and drive means for connecting said clutch means to said linkage means to pivot said blades between said open and closed positions.

13. The shutter as defined in claim 12 including spring means connected to said linkage means for decelerating said blades as they approach one of said positions and accelerating said blades as they leave said one position.

14. The shutter as defined in claim 13 wherein said drive means comprises a main drive crank pivotally connected to one of the ends of one of said blade cranks with the other end of the main drive crank pivotally connected to said clutch means for reciprocation thereby.

15. A radial vane shutter for use with a ballistic camera comprising a cylindrical housing, a plurality of pie-shaped shutter blades each having a pin projecting from the outer and inner ends thereof, said outer pins being rotatably journaled in said cylindrical housing, a ring, strut means flexibly supporting said ring concentrically within said cylindrical housing in a manner to enable the ring to float a limited amount relative to said cylindrical housing, said inner pins being rotatably journaled in said ring, a cover plate closing off one end of said ring to prevent light passing therethrough, a blade crank connected to each of said outer pins outwardly of said cylindrical housing for pivotal movement therewith, a first set of serially connected linkages encircling said cylindrical housing and interconnecting corresponding ends of said blade cranks, a second set of serially connected links encircling said housing and interconnecting the other ends of said blade cranks, high speed intermittent clutch means driven by a continuously rotating source for converting continuous rotary motion to intermittent rotary motion, a main drive crank having one end thereof pivotally connected to one of the ends of one of said blade cranks and the other end thereof pivotally connected to said clutch means for reciprocation thereby to oscillate said one blade crank, first spring means compressed by pivotal movement of said one blade crank in one direction, and second spring means compressed by pivotal movement of said one blade crank in the other direction, the compression of said first and second spring means decelerating the pivotal movement of said one blade crank and producing stored energy for assisting the acceleration of said one blade crank during the initial portion of its pivotal movement.

16. A shutter for use with a ballistic camera comprising a housing having a large aperture therein, a plurality of shutter blades, means for pivotally mounting said shutter blades on said housing for pivotal movement between a closed position wherein the blades cover said aperture to block the passage of light therethrough and an open position wherein said blades are pivoted about 90° from said closed position to freely pass light through said aperture, linkage means connected to each of said blades for pivoting the blades between said open and closed positions when the linkage means is actuated, said linkage means comprising a blade crank connected to the outer end of each of said shutter blades, a first set of serially connected linkages interconnecting corresponding ends of said blade cranks, and a second set of serially connected linkages interconnecting the other ends of said blade cranks, the first set of linkages moving in one direction and the second set of linkages moving in the opposite direction in response to pivotal movement of the blade cranks to cancel acceleration forces and thereby minimize vibration, and high speed intermittent drive means connected to said linkage means for pivoting said blades between said open and closed positions.

17. The shutter as defined in claim 16 including spring means connected to one of said blade cranks for decelerating said blades as they approach each of said positions and accelerating said blades as they leave each of said positions.

18. The shutter as defined in claim 17 wherein said high speed intermittent drive means is pivotally connected to said one blade crank.

19. The shutter as defined in claim 17 including bearing means at substantially all of the pivot points of said shutter blades and linkage means.

20. The shutter as defined in claim 1 including bearing means at substantially all of the pivot points of said shutter blades and linkage means.

21. A radial vane shutter for use with a ballistic camera comprising a cylindrical housing, a plurality of pie-shaped shutter blades, means for pivotally mounting said shutter blades within said housing for pivotal movement between a closed position wherein the shutter blades are perpendicular to the axis of said cylindrical housing to block the passage of light therethrough and an open position wherein said shutter blades are pivoted about 90° from said closed position to freely pass light through said cylindrical housing, linkage means encircling said cylindrical housing and connected to the outer end of said blades for pivoting the blades between said open and closed positions when the linkage means is actuated, said linkage means comprising a blade crank connected to the outer end of each of said shutter blades and serially connected linkages pivotally interconnecting said blades cranks, and high speed intermittent drive means connected to said linkage means for pivoting said shutter blades between said open and closed positions, said high speed intermittent drive means comprising high speed intermittent clutch means driven by a continuously rotating source for converting said continuous rotary motion to intermittent rotary motion, said clutch means including means for engaging said clutch means with said continuously rotating source for rotation thereby through a predetermined angle and disengaging said clutch means after it rotates through said predetermined angle, and means for connecting said clutch means to said linkage means for pivoting said shutter blades between said open and closed positions.

22. The shutter as defined in claim 21 wherein said drive means is connected to one of said blade cranks.

23. The shutter as defined in claim 22 including spring means connected to said one blade crank for decelerating said shutter blades as they approach each of said positions and accelerating said blades as they leave each of said positions.

24. The shutter as defined in claim 16 wherein said drive means includes control means for selectively operating said shutter blades through full cycles without stopping at the open position and half cycles wherein the shutter blades stop at least momentarily at the closed and open positions.

25. The shutter as defined in claim 4 including control means for selectively operating said shutter blades through full cycles without stopping at the open position and half cycles wherein the shutter blades stop at least momentarily at the closed and open positions.

26. The shutter as defined in claim 4 including a ring, strut means flexibly supporting said ring concentrically within said cylindrical housing in a manner to enable the ring to float a limited amount relative to said cylindrical housing, each of said blades having a pin projecting from the inner end thereof rotatably journaled in said ring, and a cover plate closing off one end of said ring to prevent light passing therethrough.

27. The shutter as defined in claim 4 including bearing means at substantially all of the pivot points of said shutter blades and linkage means.

28. The shutter as defined in claim 21 wherein said shutter blades rotate in the same direction when pivoting between said open and closed positions, and wherein the radial edges of said shutter blades overlap one another in said closed position.

29. A radial vane shutter for use with a ballistic camera comprising a cylindrical housing, a plurality of pie-shaped shutter blades, means for pivotally mounting said shutter blades within said housing for pivotal movement between a closed position wherein the blades are perpendicular to the axis of said cylindrical housing to block the passage of light therethrough and an open position wherein said blades are pivoted about 90° from said closed position to freely pass light through said cylindrical housing, linkage means encircling said cylindrical housing and connected to the outer end of each of said blades for pivoting the blades between said open and closed positions when the linkage means is actuated, high speed intermittent clutch means driven by a continuously rotating source for converting said continuous rotary motion to intermittent rotary motion, driven means for connecting said clutch means to said linkage means to pivot said blades between said open and closed positions, said clutch means comprising a clutch hub connected to said continuously rotating source for continuous rotation therewith, a clutch cam, and floating latch means for latching said clutch cam to said clutch hub for rotation therewith, said floating latch means comprising roller cage means mounted on said clutch cam for limited rotational movement relative thereto, a plurality of rollers interposed between said clutch cam and said clutch hub, the position of said rollers being controlled by said roller cage for movement between first and second positions, said rollers engaging and disengaging said clutch cam and hub in said first and second positions, respectively, shoulder means on said roller cage, latch means for releasably engaging said shoulder means against rotation, said clutch cam rotating a limited distance relative to said roller cage after said latch means engages said shoulder means, and back stop cam means for releasably locking said clutch cam after it has rotated a predetermined limited distance relative to said roller cage in response to latching of said shoulder means, said rollers being retained in said second position when said back stop cam means and latching means are engaged, and said rollers being retained in said first position when said latch means and back stop cam means are disengaged.

30. A radial vane shutter for use with a ballistic camera comprising a cylindrical housing, a plurality of pie-shaped shutter blades, means for pivotally mounting said shutter blades within said housing for pivotal movement between a closed position wherein the shutter blades are perpendicular to the axis of said cylindrical housing to block the passage of light therethrough and an open position wherein said shutter blades are pivoted about 90° from said closed position to freely pass light through said cylindrical housing, linkage means encircling said cylindrical housing and connected to the outer end of each of said blades for pivoting the blades between said open and closed positions when the linkage means is actuated, said linkage means comprising a blade crank connected to the outer end of each of said shutter blades and serially connected linkages pivotally interconnecting said blade cranks, high speed intermittent drive means connected to said linkage means for pivoting said shutter blades between said open and closed positions, said drive means including control means for selectively driving the shutter blades through full cycles without stopping at the open position and through half cycles where the shutter blades stop at least momentarily at the open and closed positions.

References Cited by the Examiner

UNITED STATES PATENTS

| | | | |
|---|---|---|---|
| 1,525,541 | 2/1925 | Hall | 240—46.11 |
| 2,600,636 | 6/1952 | Goetz | 192—33 |
| 2,685,239 | 8/1954 | Doyle | 95—53 |
| 2,925,763 | 2/1960 | Hill-Venning | 95—63 |
| 2,995,997 | 8/1961 | Nieuwenhoven | 240—46.43 |
| 3,024,700 | 3/1962 | McClellan | 88—61 |

JOHN M. HORAN, *Primary Examiner.*